US008843545B2

(12) United States Patent
Nader

(10) Patent No.: US 8,843,545 B2
(45) Date of Patent: Sep. 23, 2014

(54) SUPERVISION TIMER CONTROL MECHANISMS

(75) Inventor: Ali Nader, Malmo (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 967 days.

(21) Appl. No.: 12/956,013

(22) Filed: Nov. 30, 2010

(65) Prior Publication Data

US 2012/0136986 A1 May 31, 2012

(51) Int. Cl.
| | | |
|---|---|---|
| G06F 15/16 | (2006.01) | |
| G06F 11/00 | (2006.01) | |
| H04L 12/26 | (2006.01) | |
| G06F 9/46 | (2006.01) | |
| H04L 29/06 | (2006.01) | |
| G06F 11/07 | (2006.01) | |
| H04L 1/18 | (2006.01) | |
| H04L 29/14 | (2006.01) | |
| G06F 11/34 | (2006.01) | |
| H04L 12/24 | (2006.01) | |
| G06F 9/50 | (2006.01) | |

(52) U.S. Cl.
CPC ........ *G06F 11/0757* (2013.01); *H04L 43/0852* (2013.01); *G06F 11/3419* (2013.01); *H04L 12/2697* (2013.01); *G06F 11/3423* (2013.01); *H04L 43/50* (2013.01); *G06F 11/3414* (2013.01); *H04L 69/28* (2013.01); *H04L 41/0681* (2013.01); *H04L 1/188* (2013.01); *G06F 9/50* (2013.01); *H04L 69/40* (2013.01)
USPC ............. 709/203; 709/226; 370/252; 714/55; 718/104; 718/107

(58) Field of Classification Search
CPC ..... H04L 1/188–1/1883; H04L 47/10–47/127; H04L 19/196; H04L 69/16–69/169; H04L 69/28; H04L 69/40; H04L 41/0681; H04L 43/50; H04L 43/0852–43/0864; H04L 12/2697; G06F 11/0751–11/0757; G06F 9/50–9/5077

USPC .......... 709/201–203, 223–235; 370/230–231, 370/252, 253; 713/320–324; 714/55; 718/1, 718/100, 102–104, 107, 108
See application file for complete search history.

(56) References Cited

U.S. PATENT DOCUMENTS 6,526,433 B1 * 2/2003 Chang et al. .................. 709/201
6,601,020 B1    7/2003 Myers (Continued)

FOREIGN PATENT DOCUMENTS

EP          0 450 387 A2     10/1991

OTHER PUBLICATIONS

PCT International Search Report, mailed Feb. 25, 2011, in connection with International Application No. PCT/EP2010/068982.

(Continued)

*Primary Examiner* — Patrice Winder
*Assistant Examiner* — Julian Chang
(74) *Attorney, Agent, or Firm* — Leffler Intellectual Property Law, PLLC; Kenneth B. Leffler

(57) ABSTRACT

Controlling a device having a shared processing resource includes ascertaining a supervision timer value for a client service that uses the shared processing resource. The client service is caused to make a server request and a supervision timer is set to cause a timeout after a supervision timer value time period. Ascertaining the supervision timer value includes ascertaining which of a number of use scenarios represents an operation state of the device, the use scenarios being at least in part distinguished from one another by which services are presently active, including the client service. Each of the plurality of services utilizes the shared processing resource when active. One supervision timer value is selected from a number of values each associated with the client service, selection being made at least partly as a function of the ascertained use scenario. The value is retrieved from the set of stored supervision timer values.

27 Claims, 5 Drawing Sheets

(56) References Cited

U.S. PATENT DOCUMENTS

| | | | |
|---|---|---|---|
| 6,606,643 B1* | 8/2003 | Emens et al. | 709/203 |
| 7,136,246 B2 | 11/2006 | Khanna et al. | |
| 2005/0169201 A1* | 8/2005 | Huylebroeck | 370/311 |
| 2006/0059256 A1* | 3/2006 | Kakani | 709/224 |
| 2007/0083500 A1 | 4/2007 | Zibitsker | |
| 2009/0049312 A1* | 2/2009 | Min | 713/300 |
| 2009/0258596 A1 | 10/2009 | Naik et al. | |
| 2011/0055596 A1* | 3/2011 | Wyatt | 713/300 |
| 2011/0055597 A1* | 3/2011 | Wyatt | 713/300 |
| 2012/0036552 A1* | 2/2012 | Dare et al. | 726/1 |

OTHER PUBLICATIONS

PCT Written Opinion, mailed Feb. 25, 2011, in connection with International Application No. PCT/EP2010/068982.

Cotroneo, Domenico et al: "Adaptive monitoring n microkernel OSs", 2010 International Conference on Dependable Systems and Networks Workshops, IEEE, Piscataway, NJ, USA, Jun. 28, 2010, pp. 66-72, XP031727884, ISBN: 978-1-4244-7729-6.

* cited by examiner

SUPERVISION TIMER CONTROL MECHANISMS

BACKGROUND

The present invention relates to supervision timers that alert a client that a server has not responded within an expected response time period, and more particularly to mechanisms for deriving suitable supervision timer values to be used in supervision timers.

Today, there exist various scheduling algorithms in computer/telecommunication science dealing with system resource sharing between various data flows and processes in multi-tasking/multi-dataflow systems. The aim of all these scheduling algorithms (e.g. Round-Robin, Weighted Fair Queue, Fair Queue, Priority Inversion and so on) is to allow all services/tasks/processes/data flows to share common resource time, avoid starvation, and produce an acceptable average throughput to the overall system.

If several services competing for the very same resources need to be performed simultaneously, the very lowest layer (i.e., the Physical Layer 1, PHY) utilizes some mechanism that resolves the conflict by prioritizing the requests in a manner such that a higher priority service will be awarded access to the shared resource before the lower priority service is. This is the case regardless of whether the priorities are static in nature or are dynamically adapted to a changing environment.

In many software and/or hardware systems with distributed functionality amongst the various entities, responsibility is divided between the aforementioned entities by defining a client-server relationship between the entities. A client makes a server request, and the server at some point in time, responds to that request.

Once it has made a request, it is the client's role to wait for a response. The question then arises how long should the client wait for a response? If something were to go wrong at the server side causing it never to respond, the client could end up waiting forever. In order to avoid such behavior, a client will want some means for monitoring the activity of the server. Such monitoring could, for example, be accomplished by means of a supervision timer when the client knows the expected response time for a certain service. The client starts the supervision timer when it makes a server request. In case, for some reason, the server is not going to respond, the client's supervision timer will time out which then alerts the client to take actions accordingly.

The idea of a client supervising a server and taking proper actions in cases when the server is not responding when it should, adds quality to the experience of the end-user. In a consumer product, the client could, for example, restart the server and hide the fact that the system was hanging. In other contexts, such as in a safety-related system, the end-user could be informed of the server's failure to respond so that the end-user can take proper actions.

A problem emerges for a designer of such a system when setting/designing these supervision timers. This is especially true if the system is lacking a proper/strict time requirement for every single service designed in the system. This might not be a problem in a strict real-time system with strict requirements used in, for example, an airplane, but in most consumer products (e.g., mobile handsets) such requirements are lacking. Consider for example, a situation such as that depicted in the block diagram of FIG. 1. Here there are four services, denoted Svc1, Svc2, Svc3, and Svc4, which are capable of being run in a device 101. Each of the services has been divided into client and server portions. The clients and corresponding servers of services Svc1, Svc2, Svc3 are all located within the device 101, whereas only the client portion of Svc4 is implemented within the device 101. In the latter case, Svc4's server requests are sent to an external server 107 by means of some communication means.

The services are variously implemented in whole or in part by means of the same shared processor/circuit elements 103 and (possibly) a memory device 105. To better illustrate the example, the various services are shown as being separate from the shared processor/circuitry 103 and memory device 105. In some implementations, it may actually be the case that one or more of the services have dedicated hardware elements, separate and apart from the shared processor/circuitry 103. However, it may also be the case that any or all of the services are implemented entirely by the shared processor/circuitry 103 and memory device 105 (e.g., by means of program instructions stored in the memory device 105 that are intended for execution by the shared processor/circuitry 103). Regardless of implementation, however, the services are implemented separate and apart from one another and are individually activated.

The inventor has appreciated that if the services Svc1, Svc2, Svc3, and Svc4 were implemented independently of one another, a supervision timer value could be derived for each one by measuring the average latency between the server request and the corresponding response. However, the services Svc1, Svc2, Svc3, and Svc4 are not independent of one another, but instead share the shared processor/circuitry 103 and memory 105. Consequently, for any given one of the services Svc1, Svc2, Svc3, and Svc4, the latency between a server request and the corresponding response will depend on how much access that service has to the shared resource. If it is the only service that has been activated (which means it has exclusive use of the shared processor/circuitry 103), the measured latency will be at its lowest value. However, the more services there are that are run concurrently, the less access each one of the running services has to the shared processor/circuitry 103. This slows things down generally, and measured latencies between service requests and their corresponding responses will increase.

Designers try their best to tune supervision timer values as part of the process of designing the device, but there are many problems to deal with. Some of these problems are:

Timers are often tuned in a lab environment that does not reflect real scenarios.

Even if an effort is made to tune supervision timer values in some real scenario, it is almost impossible to foresee all different scenarios involving speed, landscape, operator network planning, and the like. The inventor has recognized that these factors affect which services are (possibly simultaneously) active in a mobile communications device, and this in turn affects the expected latency between a client request and its corresponding server response.

The inventor has recognized that it is almost impossible to foresee the dynamic behavior and the interaction of all possible services used by the end-user. As a result, apart from a few scenarios, services are often tested, one service at a time, in a lab. As explained above, there is a major difference in letting one service run with full access to all resources, and letting several services run concurrently, fighting for the same resources.

The systems are becoming more and more complex (e.g., a multi mode mobile handset with ability to provide services in accordance with different communication standards such as, but not limited to, Global System for Mobile communication (GSM), Wideband Code Division Multiple Access (WCDMA), Long Term Evolution (LTE), Wireless Local Area Network (WLAN), and the like) but little time is left in a time restricted project for re-tuning the old timers.

The very same timer values stored in one software database (perhaps some number of years earlier) are retained and used in a current implementation. Even if the timer values were optimal at the time they were determined, but the product evolves in terms of:

New features being added
Some features being removed
Some earlier algorithms being optimized in a later phase
New hardware being more powerful and faster.
The same software database being used in various hardware databases (low-end/high-end) with completely different capabilities As a result of the problems mentioned above, designers tend to set supervision timer values to unnecessarily high values in order to ensure that, whatever the operational environment, the supervision timer will not timeout prematurely, leading to a poor user experience. However, a consequence of this is that an actual server failure to respond to a client request will be detected long after it could have been.

It is therefore desired to provide better supervision timer control mechanisms that address one or more of the above-described problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for controlling a device having a shared processing resource. The control methodology includes ascertaining a supervision timer value for a client service that uses the shared processing resource. The client service is caused to make a server request, and a supervision timer is controlled so as to cause the supervision timer to timeout upon expiration of a time period corresponding to the ascertained supervision timer value. In an aspect, ascertaining the supervision timer value for the client service that uses the shared processing resource comprises ascertaining which of a plurality of use scenarios presently represents an operation state of the device, wherein the use scenarios are distinguished from one another at least in part by which of a plurality of services are presently active, wherein the plurality of services include the client service and each of the plurality of services utilizes the shared processing resource when active. One supervision timer value is selected from a set of two or more stored supervision timer values each associated with the client service, wherein the selection is made at least partly as a function of the ascertained use scenario. The selected supervision timer value is retrieved from the set of stored supervision timer values.

In some but not necessarily all embodiments, the use scenarios are further distinguished from one another at least in part by a priority level assigned to each of the presently active services, wherein how much access to the shared processing resource each presently active service gets is determined by the presently active service's assigned priority level.

In some but not necessarily all embodiments, the use scenarios are further distinguished from one another at least in part by information about a physical environment in which the device is operating. As non-limiting examples, the physical environment information could include geographical location information and/or information indicating how fast the device is moving.

In some but not necessarily all embodiments, the control methodology further includes, during an idle or sleep state of the device, selecting one of the use scenarios and putting the device into a state that corresponds to the selected use scenario whereby all of the services that are specified by the selected use scenario as being concurrently active are activated. One of the activated services is caused to make a client request, and a latency time period for a server response to the client request to be received is measured. The measured latency time period is used to adjust a supervision timer value associated with the selected use scenario and the adjusted supervision timer value is stored as part of the set of stored supervision timer values.

In another aspect controlling a device having a shared processing resource includes selecting one of a plurality of different use scenarios, wherein use scenarios are distinguished from one another at least in part by which of a plurality of services are concurrently active in the device, wherein each of the plurality of services utilizes the shared processing resource when active. The device is put into a state that corresponds to the selected use scenario whereby all of the services that are specified by the selected use scenario as being concurrently active are activated. One of the activated services is caused to make a client request, and a latency time period to receive a server response to the client request is measured. The measured latency time period is used to adjust a supervision timer value associated with the selected use scenario. The adjusted supervision timer value is stored in an entry of a stored set of entries, wherein each of the entries is associated with a different one of the use scenarios, and wherein the entry in which the adjusted supervision timer value is stored is associated with the selected use scenario In some but not necessarily all embodiments, the control methodology comprises using the stored set of supervision timer values to control a supervision timer in the device.

In some but not necessarily all embodiments, the creation and storage of adjusted supervision timer values in an entry of a stored set of entries is performed as part of a production phase of the device.

In some but not necessarily all embodiments, the creation and storage of adjusted supervision timer values in an entry of a stored set of entries is performed when the device is in an idle or sleep state.

In some but not necessarily all embodiments, the control methodology includes detecting that a present state of the device does not correspond to any use scenario for which there exists an entry stored in the set of entries, and creating a new entry for the detected present state of the device.

In some but not necessarily all embodiments, the use scenarios are further distinguished from one another at least in part by information about a physical environment in which the device is operating. As non-limiting examples, the physical environment information can include geographical location information and/or a detected speed of movement of the device.

BRIEF DESCRIPTION OF THE DRAWINGS

The objects and advantages of the invention will be understood by reading the following detailed description in conjunction with the drawings in which.

DETAILED DESCRIPTION

Figure 1:
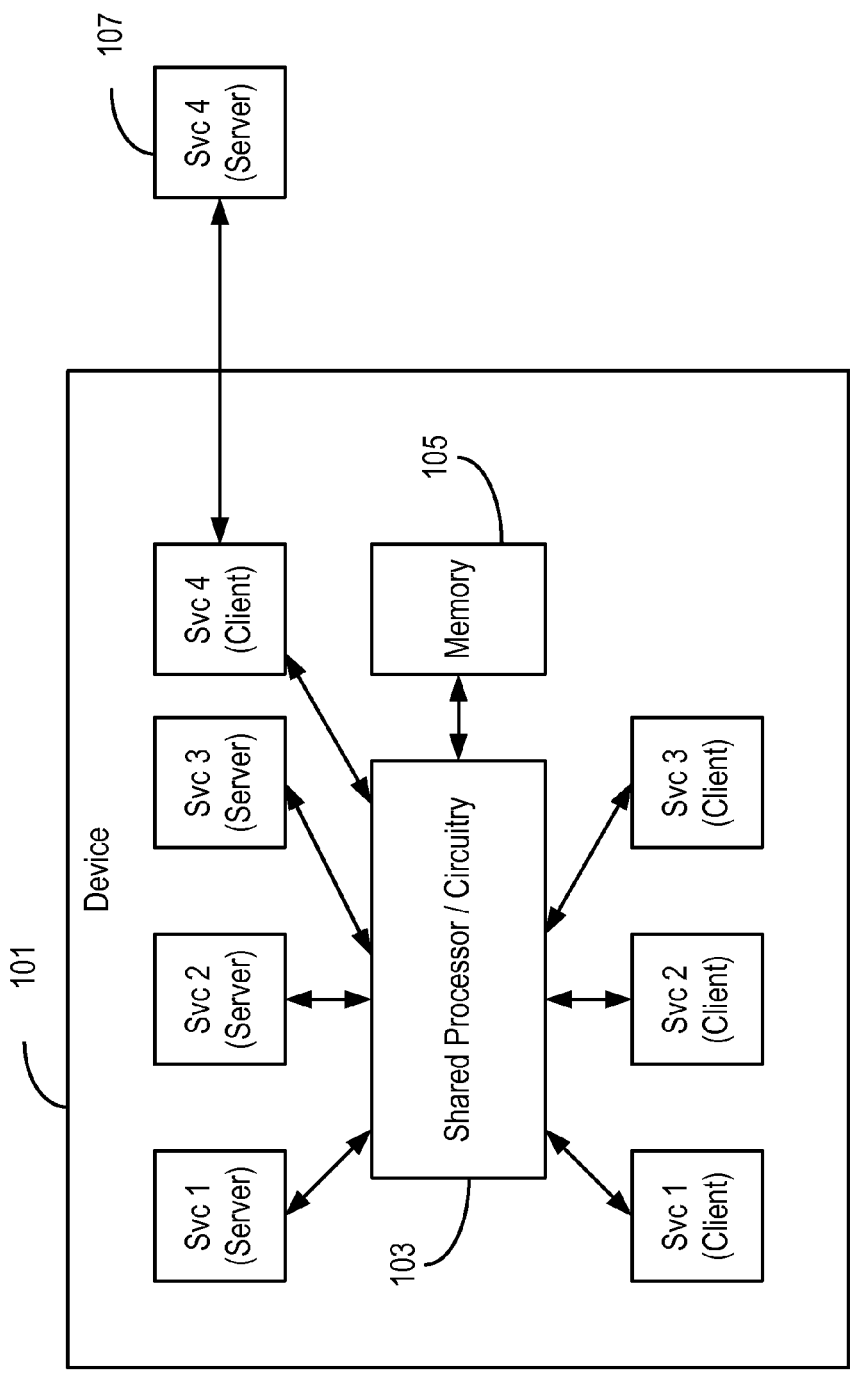
FIG. 1 is a block diagram of a device capable of running four services that rely, at least in part, on shared processor/circuitry.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of some but not necessarily all embodiments consistent with the invention is that the device itself, with its current configuration (i.e., hardware/software combination) and without involvement from the end-user, performs one or more services when the device is idle (e.g., every now and then during times when the product is not being used by the end-user). The device keeps track of every single service's latency (i.e., how long time it takes for a server to provide a certain service).

Another aspect of some but not necessarily all embodiments consistent with the invention is that the product keeps track of average latency time per service for different use scenarios (i.e., at least in part, different combinations of concurrently-running services, geographical areas, speed of device movement, and the like) run by the end-user. These measurements are used to adjust stored supervision timer values for the involved services.

These and other aspects are described further below. In these descriptions, the various aspects are described in the context of a mobile communication device. This is not intended to limit the invention to such environments, but is instead merely for the purpose of facilitating the reader's comprehension of the inventive aspects by means of the utilization of familiar terminology. The various aspects described herein are suited for any type of product involving software and/or hardware blocks in which client/server (equivalently called master/slave or similar) roles exist.

It is also to be understood that the term "supervision timer" used in this description can equivalently be replaced by any other similar term, such as but not limited to, "watch dog timer", "watch time counter", "supervision counter", and the like.

Various aspects of embodiments consistent with the invention can be practiced in two contexts, neither of which requires end-user involvement:

An initial automatic tuning of supervision timers for all services (hereinafter called "autonomous service tuning" in this document)

A periodically performed update supervision timer values by ascertaining average request/response latencies experienced by the device as it is being used by the end-user. This periodic updating (hereinafter called "scenario based tuning" in this document) is performed on a per service per use scenario basis (where different "use scenarios" may or may not be distinguished from one another, at least in part, based on the device's physical environment).

One of the aspects involves a device having a plurality of individually activatable clients all relying, at least in part, on a shared hardware resource (e.g., without limitation, shared processor/circuit elements and/or shared memory device) performing client services without the knowledge of the end-user. This can be done after manufacture but before delivery to the end-user, or after delivery to the end-user every now and then when the device is in an idle state. The device keeps track of every single service's latency (i.e., how long time it takes for a server to respond to a client's service request).

In another aspect of some but not necessarily all embodiments, latency is tracked on a per client basis for different combinations of services being activated at the same time. Each different combination is herein referred to as a "use scenario." As explained earlier, the fact that the services rely, at least in part, on a shared resource can result in generally longer latency times for at least some of the services, so for any given service, its supervision timer value may vary depending the use scenario in which it is operating.

In still another aspect of some but not necessarily all embodiments, one or more use scenarios are further characterized by the device's environment, such as what geographical area it is in, how fast it is moving, and the like.

When it is necessary to initiate a device timer, the state of the device is determined with respect to what use scenario is presently active, and the timer value previously determined for that particular use scenario is retrieved from a database and used to control the supervision timer.

These and other aspects will now be described in further detail.

The autonomous service tuning methodology mentioned above refers to running the services by the device itself without any involvement from the end-user. More particularly, at or after production of the device, but before being made available to the end-user, the device itself makes sure that every single service is run and its latency measured.

In one aspect of embodiments consistent with the invention, the services are run one-by-one, whereas in another aspect, some combinations of services are run simultaneously. In order to have meaningful estimates, it is advantageous to run the aforementioned steps several times and to average the result. As an example, in a mobile handset, services such as RSSI scan, Cell Search, and the like are run by the clients in higher layers and the latency (the time it takes for the lower layer to respond) is measured. Each resultant (average) latency value for a service is stored in a database that is addressable/searchable based on, at least in part, what combination of services were run together when the latency was measured.

All of these supervision timer values are stored in one or several databases reachable by every single client and/or server that will need to access these values.

In some but not necessarily all embodiments, the supervision timer values stored in the database are somewhat inflated compared to the measured results (e.g., added an additional amount to the measured latency value or multiplied the measured latency value by a suitable factor) in order to provide some extra time to the servers. One reason for doing this would be for those instances in which the timer values may not be fairly representative of expected latencies due to the services having been run one-by-one without competition for the shared resource.

Once the handset is made available to an end-user and powered on, the clients handling the services inside the device access the database using the present state of the device (e.g., at least in part what combination of services are presently being run) and retrieve the corresponding supervision timer value(s) that will more accurately represent how long the latency of each service is. If a server does not respond within the specified time, the client is alerted that something is wrong and takes actions accordingly. In some but not necessarily all embodiments that include servers as well as clients, a supervision timer can be implemented for use by the server as has been described with respect to clients. A server can then attempt to carry out a requested service and, upon expiration of an amount of time indicated by the supervision timer value for the existing use scenario, give up and notify the client.

It is possible that the timer values as determined by the autonomous service tuning methodology described above might be set too generously (e.g., the multiplication/addition factor mentioned above might cause an unnecessarily long delay). This might be because they are not suited to the way the specific end-user of this device utilizes the device. It might in addition, or alternatively, be because the factory environment in which the autonomous service tuning methodology takes place is not similar to the (radio- and cell planning) environment in which the device is actually operated. To compensate for this, and in accordance with another aspect of some but not necessarily all embodiments, the "scenario based tuning" takes place.

The "scenario based tuning" methodology is similar to the autonomous service tuning methodology in that supervision timer values are determined for different use scenarios, and then stored in a database for later use. The scenario based tuning methodology differs from the autonomous service tuning methodology in that it involves adjusting the existing supervision timer values by "sniffing" the actual time it takes to provide various services to the end-user under different use scenarios and storing these timer values (or using the newly acquired measurements to adjust existing stored values) in the database. The database keeps track of every single use scenario and an average time value (or, in some but not necessarily all embodiments, a maximum time value if such is better suited under some circumstances) per such use scenario.

In yet another aspect of some but not necessarily all embodiments, use scenarios are further distinguished from one another based on other factors unrelated to what combination of services are concurrently running. For example use scenarios can be further distinguished from one another based on what Subscriber Information Module (SIM) is installed in the device, and/or on the device's environmental factors such as but not limited to its geographical location (e.g., in what country it is presently located) and/or speed of physical movement. For example, what SIM card is installed could affect expected service latency times because different SIM cards could indicate different levels of quality of service to which the user is subscribed.

In another aspect of some but not necessarily all embodiments, the device maintains priority tables as disclosed in U.S. Provisional Application No. 61/310,438, filed on Mar. 4, 2010, which is hereby incorporated herein by reference; and in U.S. Provisional Application No. 61/310,453, filed on Mar. 4, 2010, which is hereby incorporated herein by reference. The priority tables provide, for each use scenario, a priority range for each active service that defines the use scenario. In an aspect of the embodiments consistent with the present invention, these priority tables can be extended to contain a supervision timer value per such entry. In another aspect, if a server is not able to provide the requested service within the given supervision time value for that use scenario, the client's server could have its priority adjusted to a higher value within its defined priority range.

In still another aspect of some but not necessarily all embodiments, a service's usage pattern used by the end-user is recorded. The recorded service usage pattern is then supplied as data input to the "autonomous service tuning" process that is run every now and then during a sleep/idle time of the device. This allows the device to create tables that more accurately reflect the actual use scenarios used by the device's end-user. In some embodiments, it is advantageous to do this analysis when the device undergoes predefined state changes, such as but not limited to the device entering a new geographical area, the device loading a software update, and the like.

The contents of the adapted databases mentioned above can in one aspect be retrieved by any means (e.g., uploaded to a server, printed to a specific output, or the like). This database serves as a very useful source of information for the developers/designers/testers of follow-up devices.

Figure 2:
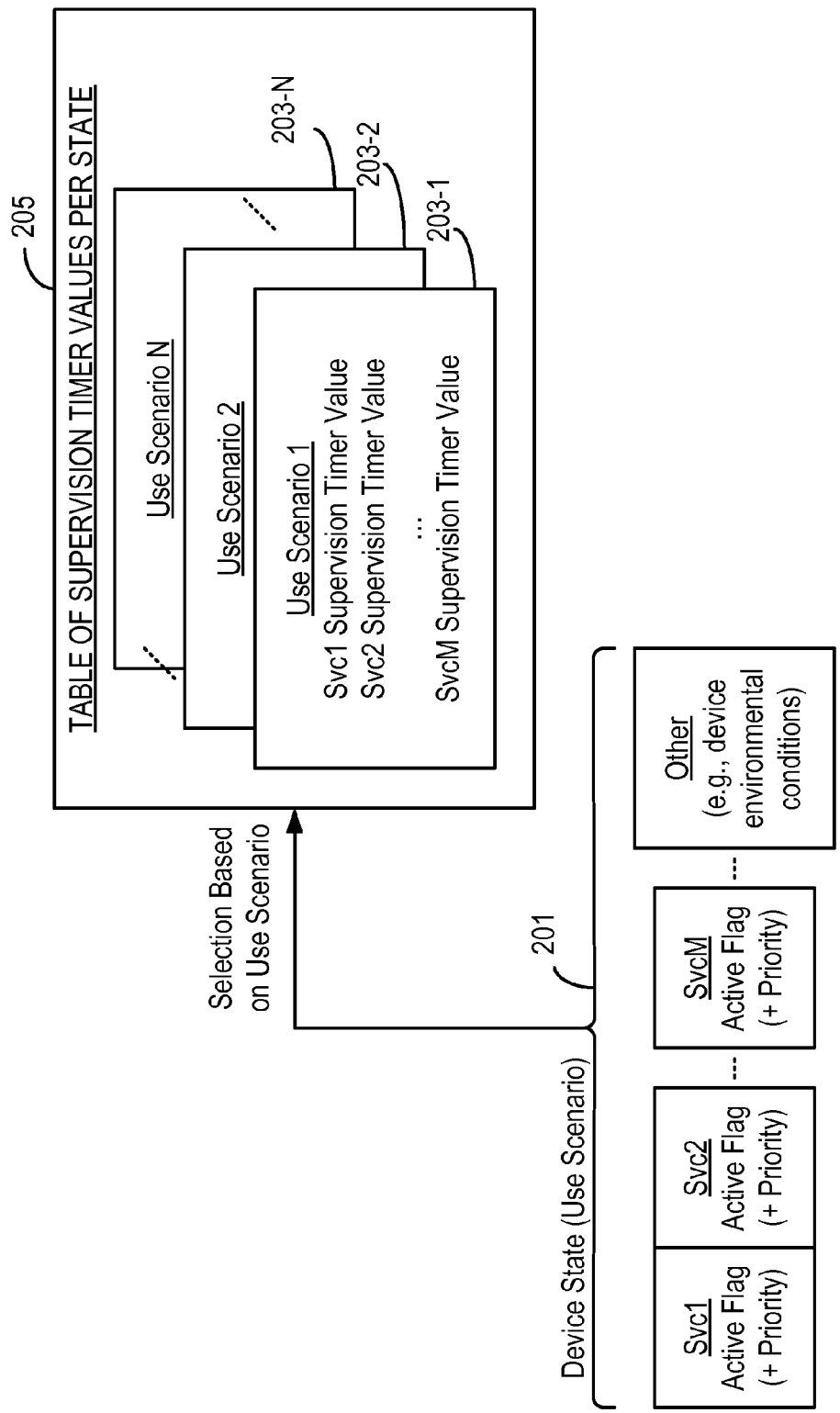
FIG. 2 is a schematic diagram illustrating an exemplary use scenario and how it is used to access one of a number of use scenario table entries.

Various aspects of embodiments consistent with the invention will now be described with reference to FIGS. 2 and 3. Looking first at FIG. 2, it is a schematic diagram illustrating, for purposes of example only, a use scenario 201 and how it is used to access one of a number of use scenario table entries 203-1, 203-2, . . . 203-N. In this example, there are a number, M, possible services, denoted Svc1, Svc2, . . . SvcM. In addition, there are a number of other (e.g., environmental) variable conditions. Each of the possible services Svc1, Svc2, . . . SvcM is associated with a flag ("Active Flag") indicating whether that service is presently active or not. The M service Active Flags in combination with the other variable conditions make up one of a number of possible states of the device. In the context of the invention, each of these states constitutes a different one of a plurality of use scenarios 201. In this exemplary embodiment, the number of possible use scenarios 201 is represented by the variable N. Each of the N use scenarios 201 has a corresponding entry 203-1, 203-2, . . . 203-N in a table 205. Each of the entries 203-1, 203-2, . . . 203-N includes, for each active service associated with that use scenario, supervision timer values to be used when the use scenario that that table entry represents the present state of the device. Merely for purposes of illustration, the illustrated table 205 includes entries 203-1, 203-2, . . . 203-N capable of holding supervision timer values for all M of the services. Recognizing that in most use scenarios at least one of the services will not be active, the timer values for the inactive services can be set to some predefined "don't care" value or simply ignored. In alternative embodiments, the table entries 203-1, 203-2, . . . 203-N are not all the same size, and hold only those supervision timer values that will be needed for the active services that go into defining that particular use scenario.

Figure 3:
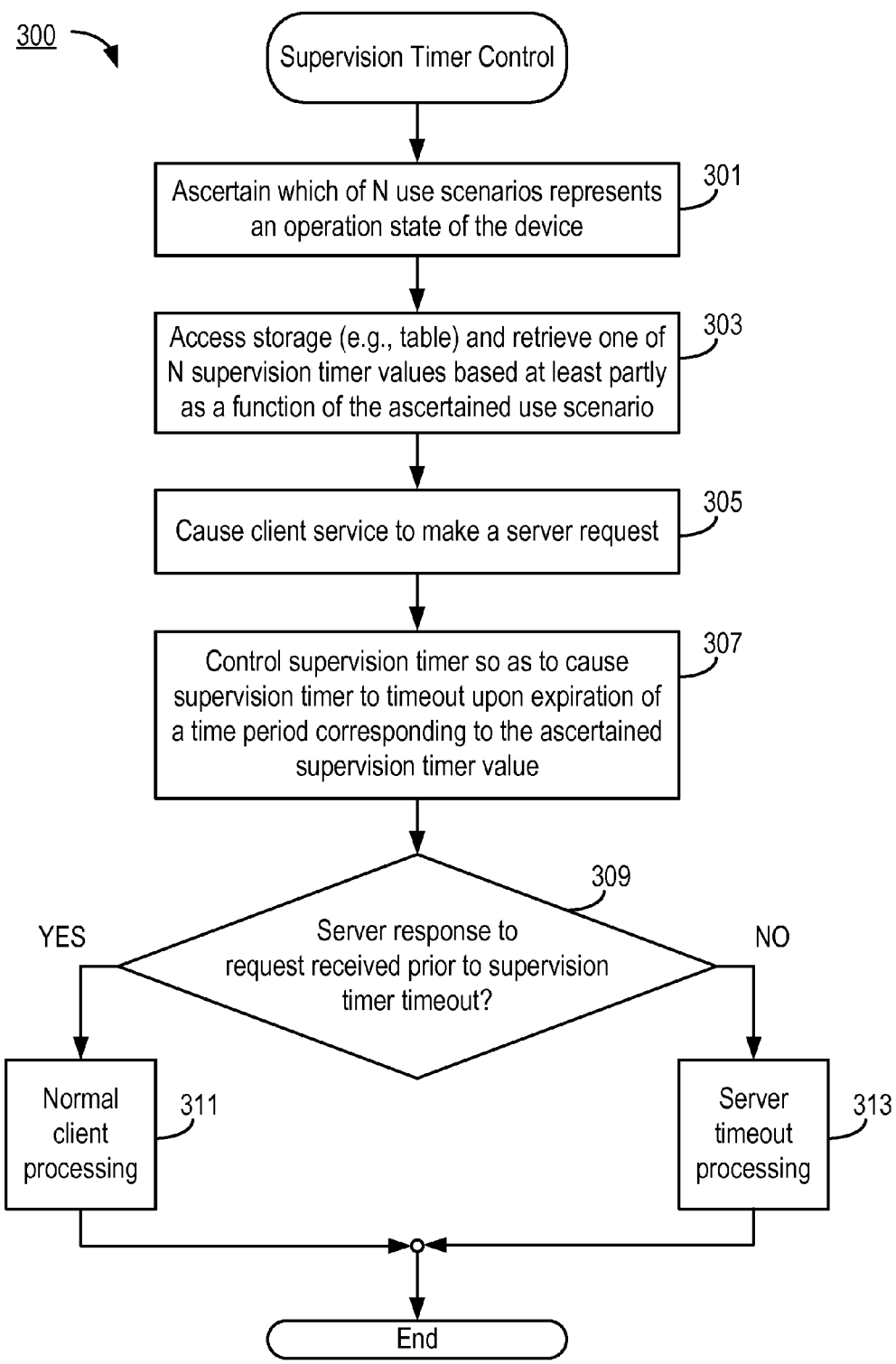
FIG. 3 is, in one respect, a flow diagram of steps/processes carried out by the device in accordance with an exemplary embodiment consistent with the invention.

FIG. 3 is, in one respect, a flow diagram of steps/processes carried out by the device in accordance with an exemplary embodiment consistent with the invention. In another respect, FIG. 3 can be considered to depict a controller 300 comprising the variously illustrated means for carrying out the described functions.

Control of a client's supervision timer involves ascertaining which of a plurality (represented by the variable N) of use scenarios 201 represents a present operational state of the device (step 301). A supervision timer value is stored in the table 205 for each use scenario involving this particular client. The present use scenario 201 is used to identify which of the N stored use scenario entries 203-1, 203-2, . . . 203-N corresponds to the present state of the device, and the client's supervision timer value saved as (at least part of) that identified use scenario entry is retrieved (step 303).

Now that a supervision timer value for this client running in the present use scenario is known, the client is caused to make a server request (step 305) and the supervision timer is controlled so as to cause it to timeout upon expiration of a time period corresponding to the ascertained supervision timer value (step 307). Of course, the order in which these steps are performed is not an essential aspect of the invention.

Having made a server request, it will either be the case that a server response is received before the supervision timer timeout ("YES" path out of decision block 309) or the supervision timeout will occur ("NO" path out of decision block 309). In case of the former, whatever constitutes "normal" follow-up processing for the client is performed (step 311). But, if the supervision timeout occurs, then whatever constitutes appropriate server timeout processing for this particular service is performed (step 313).

Figure 4:
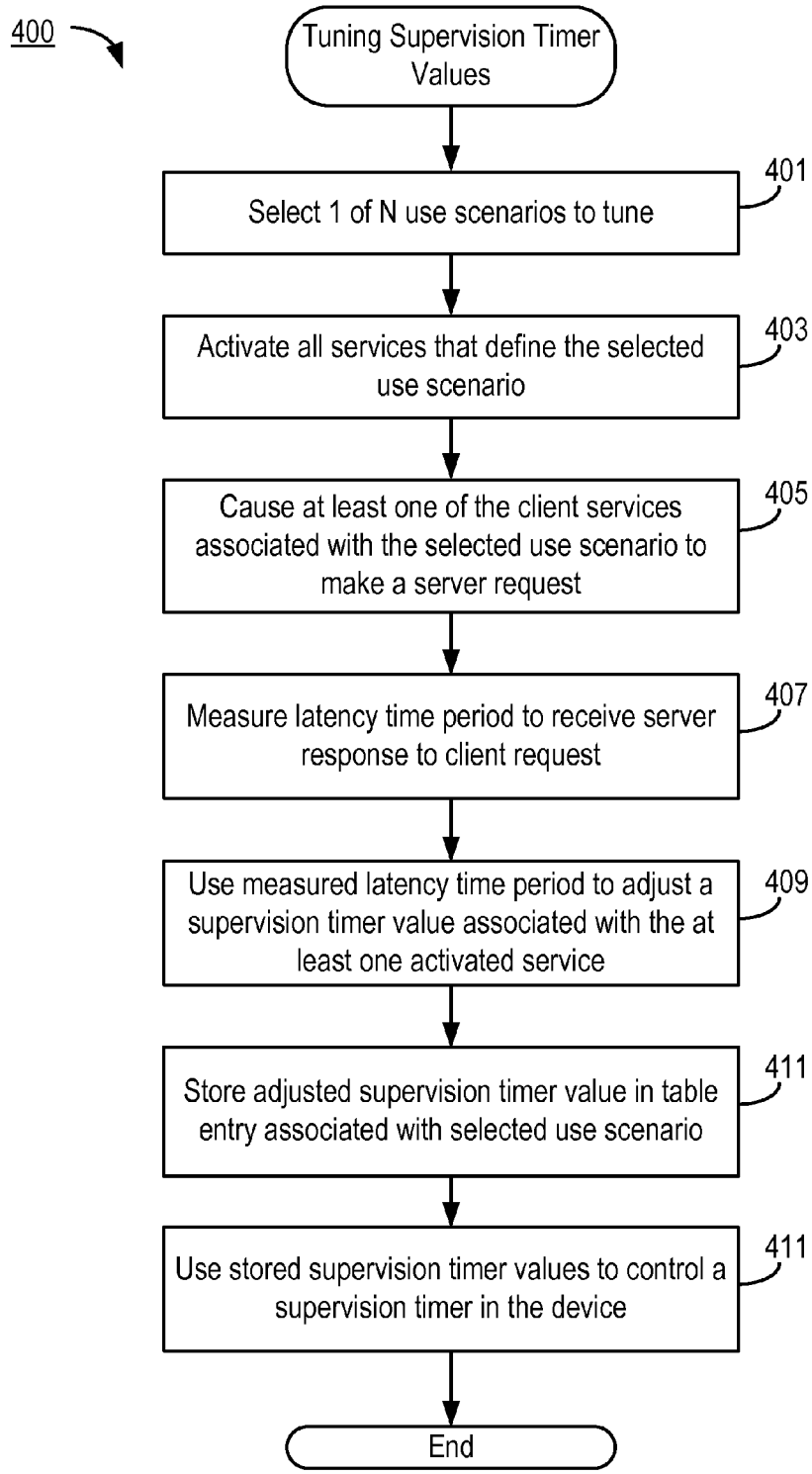
FIG. 4 is, in one respect, a flow diagram of steps/processes carried out by the device in accordance with other aspects of an exemplary embodiment consistent with the invention.

FIG. 4 is, in one respect, a flow diagram of steps/processes carried out by the device in accordance with other aspects of an exemplary embodiment consistent with the invention. In another respect, FIG. 4 can be considered to depict a controller 400 comprising the variously illustrated means for carrying out the described functions.

Here, the aspects concern tuning (or originally generating) supervision timer values for use when controlling services within a device. This is advantageously performed after production but prior to delivery of the device to an end-user (e.g., for originally generating supervision timer values) and/or during sleep/idle states of the device. Tuning a client's supervision timer involves selecting one of a plurality (represented by the variable N) of possible use scenarios, each having an associated entry stored in, for example, a table (step 401). All of the services that define the selected use scenario are caused to be activated (step 403). At least one of the client services associated with the selected use scenario is caused to make a server request (step 405). The latency time period to receive a server response to the request is then measured (step 407) and is used to adjust (or originally become) a supervision time value associated with the at least one activated service (step 409). In some embodiments, it is advantageous to cause a number of client requests to be made, and for a number of latency time periods to be measured and then filtered in some manner (e.g., averaged) to arrive at a more meaningful result.

The adjusted (or newly generated) supervision timer value is stored in a table entry associated with the selected use scenario (step 411).

The above-described steps can be performed for each client for each possible use scenario. Once the table has been populated with supervision timer values, these timer values are (during normal operation of the device) used to control the device's supervision timer (step 411) as described, for example, with reference to FIG. 3.

Figure 5:
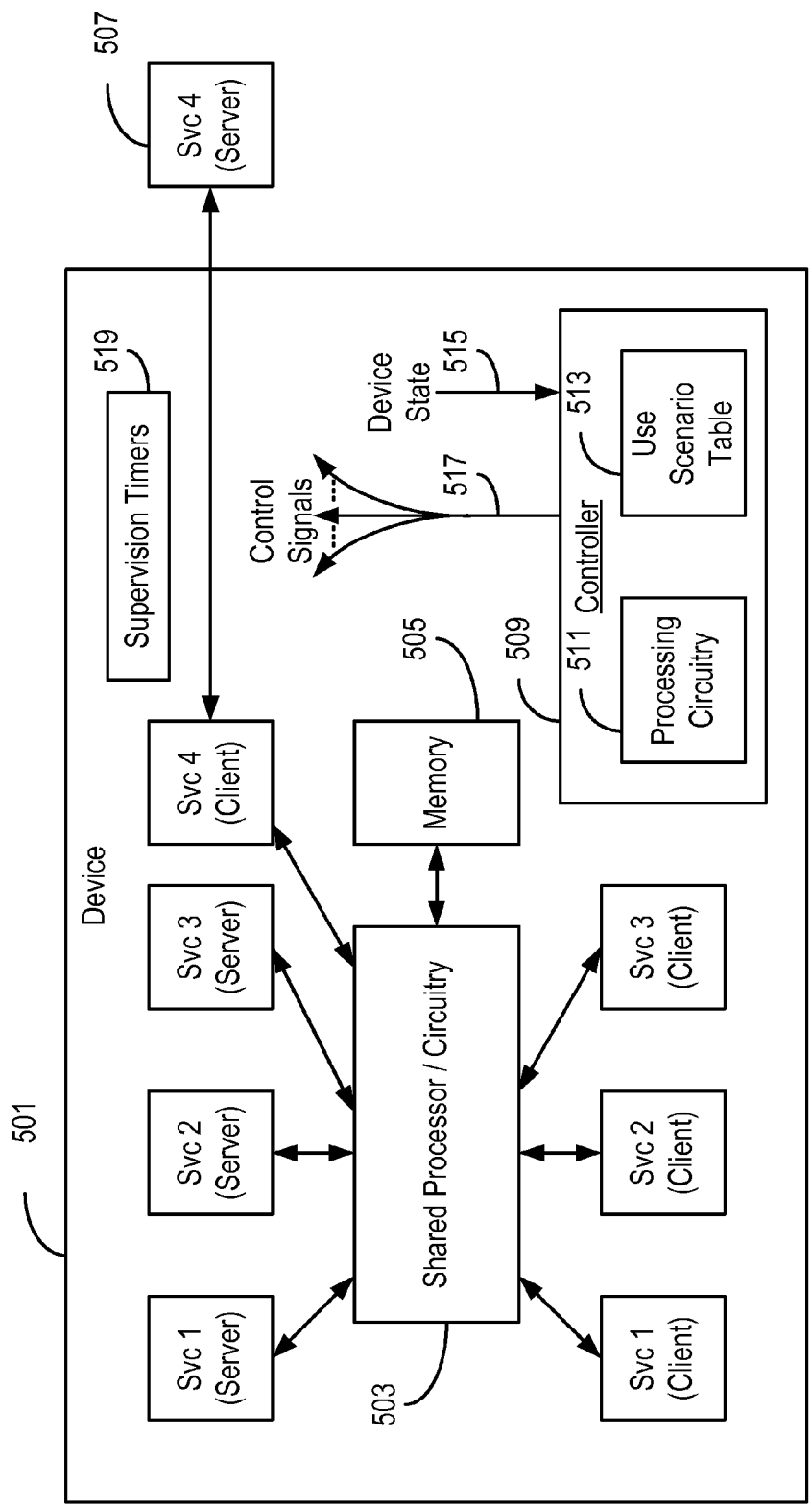
FIG. 5 is a block diagram of an exemplary embodiment of a device 510 consistent with aspects of the invention.

FIG. 5 is a block diagram of an exemplary embodiment of a device 510 consistent with aspects of the invention. For purposes of illustration, there are four services depicted. There could, of course, be fewer or more services in other embodiments. The four services are denoted Svc1, Svc2, Svc3, and Svc4, and they are capable of being run in the device 501. Each of the services has been divided into client and server portions. The clients and corresponding servers of services Svc1, Svc2, Svc3 are all located within the device 501, whereas only the client portion of Svc4 is implemented within the device 501. In the latter case, Svc4's server requests are sent to an external server 507 by means of some communication means.

The services are variously implemented in whole or in part by means of the same shared processor/circuit elements 503 and (possibly) a memory device 505. To better illustrate the example, the various services are shown as being separate from the shared processor/circuitry 503 and memory device 505. In some implementations, it may actually be the case that one or more of the services have dedicated hardware elements, separate and apart from the shared processor/circuitry 503. However, it may also be the case that any or all of the services are implemented entirely by the shared processor/circuitry 503 and memory device 505 (e.g., by means of program instructions stored in the memory device 505 that are intended for execution by the shared processor/circuitry 503). Regardless of implementation, however, the services are implemented separate and apart from one another and are individually activated.

The device 501 further includes a controller 509 which, in this embodiment, comprises processing circuitry 511 and a use scenario table 513. The processing circuitry 511 and use scenario table 513 operate together in a manner such as that described with respect to either or both of FIGS. 3 and 4. To carry out these functions, the controller 509 receives state information 515 from implementation-dependent points within the device. The controller 509 generates one or more control signals 517 which control such as elements as the supervision timers 519 within the device 501.

The various embodiments consistent with the invention provide a number of advantages over conventional supervision timer mechanisms. For example, the designer of the device is relieved of having to spend time and effort on tuning these timers, so a lot of project development time is saved.

Furthermore, by maintaining historical records of tuned supervision timer values that are made available to designers, accurate feedback can be given to the people working with product specifications for future designs. Instead of guesses, the product itself gives feedback about what the actual latency is for every single service per product in different use scenarios.

Much better systemization can be done in the future as there is now access to accurate figures from the product.

Perhaps most importantly, the device, when operated by the end-user, utilizes very accurate supervision timer values fit for the various environments and hence detects deadlock situations much more accurately than conventional methods do.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling a device having a shared processing resource, the method comprising:
    ascertaining a supervision timer value for a client service that uses the shared processing resource;
    causing the client service to make a server request; and
    controlling a supervision timer so as to cause the supervision timer to timeout upon expiration of a time period corresponding to the ascertained supervision timer value,
    wherein ascertaining the supervision timer value for the client service that uses the shared processing resource comprises:
        ascertaining which of a plurality of use scenarios presently represents an operation state of the device, wherein the use scenarios are distinguished from one another at least in part by which of a plurality of services are presently active, wherein the plurality of services include the client service and each of the plurality of services utilizes the shared processing resource when active;
        selecting one supervision timer value from a set of two or more stored supervision timer values each associated with the client service, wherein said selection is made at least partly as a function of the ascertained use scenario; and
        retrieving the selected supervision timer value from the set of stored supervision timer values.

2. The method of claim 1, wherein the use scenarios are further distinguished from one another at least in part by a priority level assigned to each of the presently active services, wherein how much access to the shared processing resource each presently active service gets is determined by the presently active service's assigned priority level.

3. The method of claim 1, wherein the use scenarios are further distinguished from one another at least in part by information about a physical environment in which the device is operating.

4. The method of claim 3, wherein the physical environment information includes geographical location information.

5. The method of claim 3, wherein the physical environment information includes information indicating how fast the device is moving.

6. The method of claim 1, wherein the method further comprises:
    during an idle or sleep state of the device, selecting one of the use scenarios and putting the device into a state that corresponds to the selected use scenario whereby all of the services that are specified by the selected use scenario as being concurrently active are activated;
    causing one of the activated services to make a client request;
    measuring a latency time period for a server response to the client request to be received; and
    using the measured latency time period to adjust a supervision timer value associated with the selected use scenario and storing the adjusted supervision timer value as part of the set of stored supervision timer values.

7. A method of controlling a device having a shared processing resource, the method comprising:
    selecting one of a plurality of different use scenarios, wherein use scenarios are distinguished from one another at least in part by which of a plurality of services are concurrently active in the device, wherein each of the plurality of services utilizes the shared processing resource when active;
    putting the device into a state that corresponds to the selected use scenario whereby all of the services that are specified by the selected use scenario as being concurrently active are activated;
    causing one of the activated services to make a client request;
    measuring a latency time period to receive a server response to the client request;
    using the measured latency time period to adjust a supervision timer value associated with the selected use scenario; and
    storing the adjusted supervision timer value in an entry of a stored set of entries, wherein each of the entries is associated with a different one of the use scenarios, and wherein the entry in which the adjusted supervision timer value is stored is associated with the selected use scenario 8. The method of claim 7, comprising:
    using the stored set of supervision timer values to control a supervision timer in the device.

9. The method of claim 7, comprising:
    performing the method as part of a production phase of the device.

10. The method of claim 7, comprising:
    performing the method when the device is in an idle or sleep state.

11. The method of claim 7, comprising:
    detecting that a present state of the device does not correspond to any use scenario for which there exists an entry stored in the set of entries; and
    creating a new entry for the detected present state of the device.

12. The method of claim 7, wherein the use scenarios are further distinguished from one another at least in part by information about a physical environment in which the device is operating.

13. The method of claim 12, wherein the physical environment information includes geographical location information.

14. The method of claim 12, wherein the physical environment information includes a detected speed of movement of the device.

15. An apparatus for controlling a device having a shared processing resource, the apparatus comprising:
    circuitry configured to ascertain a supervision timer value for a client service that uses the shared processing resource;
    circuitry configured to cause the client service to make a server request; and
    circuitry configured to control a supervision timer so as to cause the supervision timer to timeout upon expiration of a time period corresponding to the ascertained supervision timer value,
    wherein the circuitry configured to ascertain the supervision timer value for the client service that uses the shared processing resource comprises:

circuitry configured to ascertain which of a plurality of use scenarios presently represents an operation state of the device, wherein the use scenarios are distinguished from one another at least in part by which of a plurality of services are presently active, wherein the plurality of services include the client service and each of the plurality of services utilizes the shared processing resource when active;

circuitry configured to select one supervision timer value from a set of two or more stored supervision timer values each associated with the client service, wherein said selection is made at least partly as a function of the ascertained use scenario; and circuitry configured to retrieve the selected supervision timer value from the set of stored supervision timer values.

16. The apparatus of claim 15, wherein the use scenarios are further distinguished from one another at least in part by a priority level assigned to each of the presently active services, wherein how much access to the shared processing resource each presently active service gets is determined by the presently active service's assigned priority level.

17. The apparatus of claim 15, wherein the use scenarios are further distinguished from one another at least in part by information about a physical environment in which the device is operating.

18. The apparatus of claim 17, wherein the physical environment information includes geographical location information.

19. The apparatus of claim 17, wherein the physical environment information includes information indicating how fast the device is moving.

20. The apparatus of claim 15, wherein the apparatus further comprises:

circuitry configured to select, during an idle or sleep state of the device, one of the use scenarios and to put the device into a state that corresponds to the selected use scenario whereby all of the services that are specified by the selected use scenario as being concurrently active are activated;

circuitry configured to cause one of the activated services to make a client request;

circuitry configured to measure a latency time period for a server response to the client request to be received; and circuitry configured to use the measured latency time period to adjust a supervision timer value associated with the selected use scenario and to store the adjusted supervision timer value as part of the set of stored supervision timer values.

21. An apparatus for controlling a device having a shared processing resource, the apparatus comprising:

circuitry configured to select one of a plurality of different use scenarios, wherein use scenarios are distinguished from one another at least in part by which of a plurality of services are concurrently active in the device, wherein each of the plurality of services utilizes the shared processing resource when active;

circuitry configured to put the device into a state that corresponds to the selected use scenario whereby all of the services that are specified by the selected use scenario as being concurrently active are activated;

circuitry configured to cause one of the activated services to make a client request;

circuitry configured to measure a latency time period to receive a server response to the client request;

circuitry configured to use the measured latency time period to adjust a supervision timer value associated with the selected use scenario; and circuitry configured to store the adjusted supervision timer value in an entry of a stored set of entries, wherein each of the entries is associated with a different one of the use scenarios, and wherein the entry in which the adjusted supervision timer value is stored is associated with the selected use scenario 22. The apparatus of claim 21, comprising:
circuitry configured to use the stored set of supervision timer values to control a supervision timer in the device.

23. The apparatus of claim 21, comprising
circuitry configured to activate one or more of the circuitry of claim 21 when the device is an idle or sleep state.

24. The apparatus of claim 21, comprising:
circuitry configured to detect that a present state of the device does not correspond to any use scenario for which there exists an entry stored in the set of entries; and
circuitry configured to create a new entry for the detected present state of the device.

25. The apparatus of claim 21, wherein the use scenarios are further distinguished from one another at least in part by information about a physical environment in which the device is operating.

26. The apparatus of claim 25, wherein the physical environment information includes geographical location information.

27. The apparatus of claim 25, wherein the physical environment information includes a detected speed of movement of the device.

* * * * *